United States Patent [19]

Hagmanns

[11] Patent Number: 5,615,208
[45] Date of Patent: Mar. 25, 1997

[54] KALMAN FILTER FOR CHANNEL IMPULSE-RESPONSE ADAPTION IN RECEIVERS FOR TDMA MOBILE RADIO SYSTEMS

[75] Inventor: Franz-Josef Hagmanns, Backnang, Germany

[73] Assignee: ANT Nachrichtentechnik GmbH, Backnang, Germany

[21] Appl. No.: 507,474

[22] PCT Filed: Mar. 19, 1994

[86] PCT No.: PCT/DE94/00306

§ 371 Date: Aug. 28, 1995

§ 102(e) Date: Aug. 28, 1995

[87] PCT Pub. No.: WO94/24796

PCT Pub. Date: Oct. 27, 1994

[30] Foreign Application Priority Data

Apr. 8, 1993 [DE] Germany .......................... 43 11 656.6

[51] Int. Cl.⁶ .................................................. H04L 25/30
[52] U.S. Cl. ........................................ 370/252; 375/232
[58] Field of Search .............................. 375/232; 370/17, 370/79, 13, 14

[56] References Cited

FOREIGN PATENT DOCUMENTS

| 0520969 | 12/1992 | European Pat. Off. |
| 0524597 | 1/1993 | European Pat. Off. |
| 0524756 | 1/1993 | European Pat. Off. |
| WO94/24798 | 10/1994 | WIPO ............... H04L 25/30 |

OTHER PUBLICATIONS

D'Aria et al, "Fast Adaptive Equalizers for Narrow–Band TDMA Mobile Radio", IEEE Trans. on Vehicular Tech., vol. 40, No. 2, pp. 392–404 May 91.

(List continued on next page.)

*Primary Examiner*—Douglas W. Olms
*Assistant Examiner*—Matthew C. Phillips
*Attorney, Agent, or Firm*—Spencer & Frank

[57] ABSTRACT

A method for adaptation to the time-variable channel impulse response during a burst in receivers for TDMA mobile radio systems, each burst including in the center a test sequence which is known to the receiver and by means of which an initial estimate of the channel impulse response is possible, wherein the received signal of a burst is suitably sampled, the received burst is divided in 2N+1 sectors $A_{-N}, \ldots, A_{+N}$, it being assumed that the channel impulse response can be regarded as being constant within a sector, a vector $\hat{x}$ of dimension (2N+1)L is defined, L being the number of channel impulse response coefficients and the (iL+l)-th component of $\hat{x}$, $-N \leq i \leq +N$, $0 \leq l \leq L-1$ is initialized before the start of the detection using the l-th coefficient of the estimated value of the channel impulse response obtained from the test sequence, Matrices $E$, $E_i$, $E_{ii}$, $S$ and vectors $\hat{x}_i$, $d$, $r_i$ are defined, each burst is processed in 2N steps, where
in the k-th step, the i-th sector is detected using the components iL,...,(i+1)L−1 of the vector $\hat{x}$, where the sector $A_i$ is selected in accordance with a suitable method, for example that described in [5],
the matrix $$P = E_i S^* [\sigma^2 I + S E_{ii} S^*]^{-1}$$

is calculated,
and the recursions $$\hat{x} := \hat{x} + Pd$$

$$E := E + PSE_i^*$$

are carried out.

1 Claim, 3 Drawing Sheets

OTHER PUBLICATIONS

A. Morgül et al.: "New Optimum Recursive Parameter Estimation/Detection using Unreliable Erasure Declaring Detectors"; Fifth European Signal Processing Conf., 18–21 Sep. 1990, pp. 225–228.

S.N. Crozier et al.: "Reduced complexity short–block date detection techniques for fading time–dispersive channels." In: IEEE transactions on vehicular technology, vol. 41, No. 3, Aug. 1992, pp. 255–265.

G.W. Davidson et al.: "An investigation of block–adaptive decision feedback equalization for frequency selective fading channels." In: Can. J. Ele. Comp. Eng., vol. 13, No. 3–4, Mar. 1988, pp. 106–111.

3 TAIL BITS | 58 DATA BITS | 26 TEST BITS | 58 DATA BITS | 3 TAIL BITS

KALMAN FILTER FOR CHANNEL IMPULSE-RESPONSE ADAPTION IN RECEIVERS FOR TDMA MOBILE RADIO SYSTEMS

1. BACKGROUND OF THE INVENTION

The invention relates to the problem of adaptive data detection in a mobile radio receiver. "Adaptive" means that a device is provided in the receiver, which device can understand the time changes of the properties of the mobile radio channel. Such devices normally operate using the LMS (Least Mean Squares) (see for example, citation [1]), or the RLS (Recursive Least Squares) (see for example, citation [2]) algorithm. These algorithms adapt to the properties of the transmission channel continually with time.

EP-A-520 969 specifies an estimation method for data detection, in the case of which received samples in a time slot are initially stored and processed starting with the first received value, to be precise to beyond a fading incursion; further processing is then carried out, starting with the last stored sample, in order to produce estimated values of the transmitted data.

A Kalman filter for adaptation of the channel impulse response in a mobile radio receiver is described in Fifth European Signal Processing Conference, Sep. 18–21 1990, Barcelona, ES; Elsevier, Amsterdam, NL, 1990; pages 225–228, Morgül & Dzung: "New optimum recursive parameter estimation/detection using unreliable erasure declaring detectors". In this case, the Kalman algorithm is applied only to the channel impulse response which is present at a specific time.

The present patent application shows that the algorithms which are continuously adapted with time fail under certain conditions, which are typical for mobile radios. The reason for this is that such adaptation algorithms can be regarded as time-variant first order recursive filters. Higher order algorithms exhibit a behavior which is better in principle.

2.1 Model of the transmission system

Figure 1:
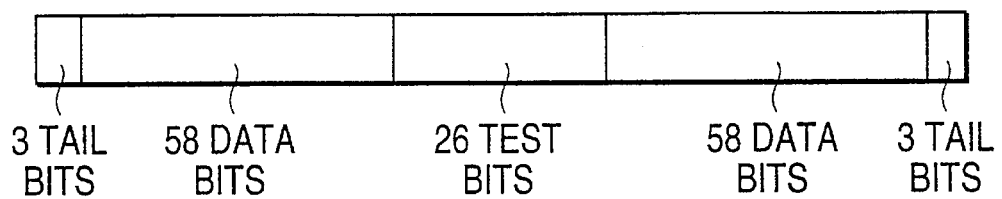
FIG. 1 shows the data structure which are transmitted in TDMA bursts in a GSM mobile radio system.

In digital TDMA mobile radio systems, the data are transmitted in bursts. In the GSM system, 116 data bits, for example, are combined to form a burst. The burst structure which is chosen for this purpose is illustrated in FIG. 1. In addition to the 116 data bits, which are grouped into two sections of 58 bits each, the burst also includes at each of the ends 3 so-called "tail bits" and in the center a so-called test sequence, comprising 26 bits, so that the burst comprises a total of 148 bits.

The test sequence is used to "survey" the transmission channel. This transmission channel can be regarded as a linear time-variant filter [4] and surveying of the transmission channel thus has the same meaning as an estimate of the channel impulse response.

A measure of the rate of change of the channel is the so-called Doppler frequency $$f_d = f_0 \frac{v}{c}.$$

where $f_0$ is the carrier frequency of the transmitted signal, v the speed of the mobile subscriber and c the speed of light. The length of a burst is selected such that, despite the possible changes, the channel impulse response during a burst can be regarded as being virtually constant. In the case of GSM, this assumption is valid for speeds v of up to about 250 km/h (the carrier frequency $f_0$ is around 900 MHz, and the burst duration is around 546 μs).

The method according to the invention is predicated on a burst transmission similar to that in the case of GSM. In particular, the presence of a test sequence in the center of the burst is significant.

Figure 2:
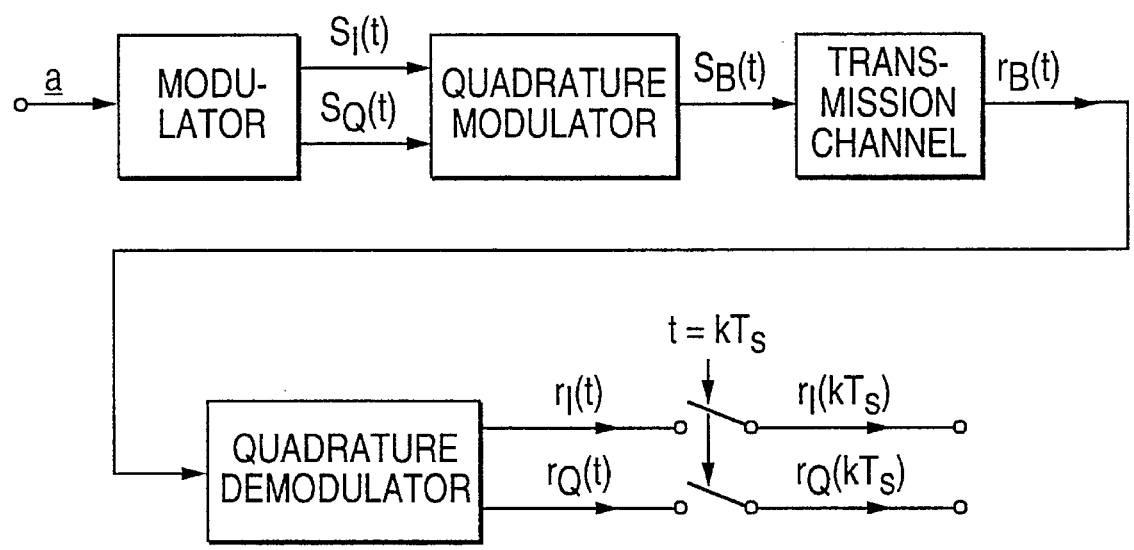
FIG. 2 shows a block diagram of the transmission path.

Those parts of the transmitter and receiver which are important for the definition of the signals are illustrated in FIG. 2. The modulator maps the data sequence a to be transmitted into the signal s(t). It is assumed that s(t) is a complex low-pass signal having the quadrature components $s_I(t)$ and $s_Q(t)$, that is to say $$s(t) = s_I(t) + j s_Q(t).$$

In this case, $j = \sqrt{-1}$ is the imaginary unit. It is furthermore assumed that $W_s$ is the bandwidth of the signal. s(t) can thus be represented unambiguously, in accordance with the sampling theorem, by the samples $s(kT_s)$ where $T_s = 1/W_s \cdot s(t)$ is mapped by the quadrature modulator into the RF signal $$s_B(t) = Re\{s(t)e^{j2\pi f_0 t}\} = s_I(t)\cos 2\pi f_0 t - s_Q(t)\sin 2\pi f_0 t$$

where $f_0$ is the desired carrier frequency. $s_B(t)$ is further amplified if necessary and transmitted via the antenna.

$r_B(t)$ is assumed to be the RF received signal to which, as $s_B(t)$, in accordance with $$r_B(t) = Re\{r(t)e^{j2\pi f_0 t}\} = r_I(t)\cos 2\pi f_0 t - r_Q(t)\sin 2\pi f_0 t$$

a complex low-pass signal $$r(t) = r_I(t) + j r_Q(t)$$

can be assigned. The quadrature demodulator at the receiver end is used to obtain this signal. Like s(t), r(t) is a low-pass signal of bandwidth $W_s$; r(t) can thus likewise be represented by the samples $r(kT_s)$.

In mobile radio, it is assumed that the relationship between the received signal samples and the transmitted signal samples is:

$$r(kT_s) = \sum_l h(l, kT_s) s((k-l)T_s) + n(kT_s)$$

The sum describes a time-discrete convolution; $h(l,kT_s)$ is the l-th coefficient of the (time-variant) channel impulse response at the time $t = kT_s \cdot n(kT_s)$ symbolizes an additional interference component; in mobile radio, this is normally composed of thermal noise and signals from other transmitters. It is assumed in the following text that this interference component has no mean value, has a gaussian distribution and has the correlation properties $$\langle n(kT_s)n*(lT_s)\rangle = \sigma^2 \delta kl.$$

$\langle x \rangle$ is in general used as the notation for the expected value of the random variables x.

The time constant $T_s$ is always omitted from the notation in the following analyses; it is furthermore assumed that the channel impulse response coefficients differ from 0 only for l=0, . . .L–1. The above relationship between the received signal samples and the transmitted signal samples then becomes $$r(k) = \sum_{l=0}^{L-1} h(l,k)s(k-l) + n(k). \tag{1}$$

In order to simplify the notation, the channel impulse response coefficients at the time $kT_s$ are combined to form the vector $$h(k) = (h(0,k), \ldots, h(L-1,k))^T$$

With respect to the notation: multidimensional variables such as vectors and matrices are marked by an underscore. The first summand in equation (1) can be called the useful component, and the second the interference component of the received signal.

2.2 General principle of detection

In order to describe the method according to the invention, it is important that the channel impulse response in the receiver must be known in order to determine the transmitted data. This follows directly from equation (1). If it is assumed that the noise signal is not present, that is to say n(k)=0, then the received signal is dependent only on the transmitted signal and the channel impulse response. Thus, if the received signal and the channel impulse response are known, then equation (1) can be solved on the basis of the transmitted signal and the transmitted data can subsequently be determined by inversion of the modulation. The converse applies: if the data are known, then (1) can be solved on the basis of the channel impulse response. If n(k)≠0, then it is not possible to find any direct solution of equation (1) on the basis of s(k–l) or h(l,k); nevertheless, it is also true here that the channel impulse response must be known in order to determine the transmitted signal, and vice versa. The determined values for the data and the channel impulse response are estimated values, because the noise n(k) is not insignificant.

Figure 3:
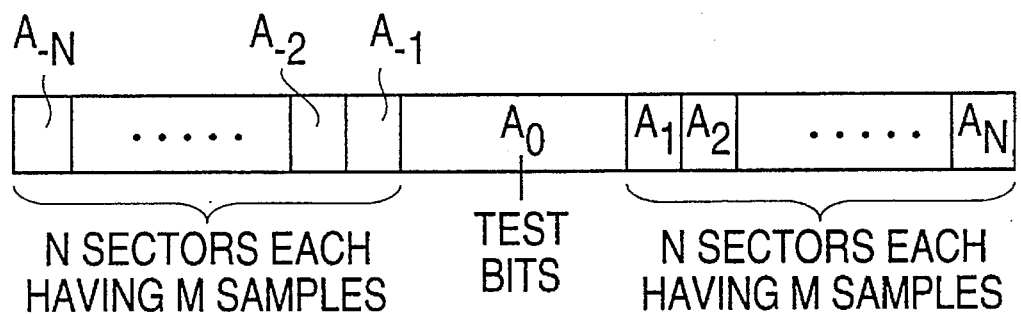
FIG. 3 illustrates the splitting of a TDMA burst into sectors.

The general principle of detection can now be described as follows. The received burst is divided into 2N+1 sectors $A_i$, $-N \leq i \leq +N$, which do not necessarily need to be of the same length. However, the length of the sectors should be selected such that the channel impulse response can be assumed to be constant within a sector. The sector $A_0$ should be identical to the test sequence. Such splitting into sectors is illustrated in FIG. 3.

Since the test sequence is known, the channel impulse response can be determined for the sector $A_0$. Since the channel impulse responses in adjacent sectors differ from one another only slightly, the data in the sectors $A_{-1}$ and $A_{+1}$ can be determined with the aid of the estimated value of the channel impulse response in the sector $A_0$. The channel impulse responses of these sectors can now be estimated using these data. The channel impulse responses are then in turn used for data detection in the sectors $A_{-2}$ and $A_{+2}$, etc.

The estimation of the channel impulse response in the sector $A_i$, i>0 will be based not only on the data detected in this sector but also, for example, on the channel impulse response in the sector $A_{i-1}$. The reason for this is that the channel impulse responses vary only slightly from sector to sector; the channel impulse responses of the individual sectors are highly correlated with one another.

The idea on which the invention is based consists essentially of the knowledge that the correlations of the channel impulse response coefficients should be used as far as possible, that is to say all the channel impulse responses of the already processed sectors should be considered in the determination of the channel impulse response for the sector $A_i$. However, this makes sense only if the estimated values of the channel impulse responses of the already processed sectors are also reliable. For this reason, the processing of the burst should be carried out, starting with the most reliable sector, in the direction of reducing reliability (see [5]).

2.3 Previously known solutions

The mostly widely known methods for channel impulse response adaptation are the LMS algorithm and the RLS algorithm. In both cases, the sectors outside the test sequence each consist of only one signal sample. $\hat{h}(i)$ is assumed to be the estimated value of the channel impulse response for the i-th sector. For i>0, both algorithms calculate $$\hat{h}(i) = \hat{h}(i-1) + P(i)d(i). \tag{2}$$

Where P(i) is a vector of the same dimension as $\hat{h}(i)$ and $$d(i) = r(i) - \hat{r}(i) \tag{3}$$

is the error between the actual received signal r(i) and the received signal model $$\hat{r}(i) = \sum_{l=0}^{L-1} \hat{h}(l,i-1)s(i-l). \tag{4}$$

Equation (2) describes the fact that $\hat{h}(i)$ is dependent only on $\hat{h}(i-1)$, that is to say the estimated channel impulse response in the preceding sector. The detected data are required to calculate the error d(i).

These analyses apply both for the LMS algorithm and for the RLS algorithm. The difference between the two algorithms is the choice of P(i). Since every new estimated value of the channel impulse response depends, in accordance with equation (2), only on the immediately preceding value, it is possible to speak of first order algorithms (by analogy with the theory of recursive time-discrete filters).

The time direction in the adaptation equation (2) can be reversed. This then gives $$\hat{h}(i) = \hat{h}(i+1) + P(i)d(i). \tag{5}$$

This is important for processing the sectors $A_i$ where i<0.

First order algorithms fail under two conditions.

1. If the estimated value of the channel impulse response in sector $A_{i-1}$ is completely false, then the data detection in the sector $A_i$ is also erroneous since this is actually being carried out using the estimated channel impulse response of sector $A_{i-1}$. Since the estimated value of the channel impulse response in the sector $A_i$ depends only on $\hat{h}(i-1)$ and the data of sector $A_i$, this is also completely false. An incorrect estimate of the channel impulse response in the sector $A_{i-1}$ thus leads, with high probability, to an incorrect estimate of the channel impulse response in the sector $A_i$.

2. If the components of the channel impulse response vector in the sector $A_i$ are so small that the useful component of the received signal is small in comparison with the interference component, then there is a high probability that the data detection in this sector will be erroneous. It now follows from equations (2), (3) and (4) that the change in the channel impulse response from the sector $A_{i-1}$ to the sector $A_i$ cannot be understood completely; the estimated change is, rather, completely random. It follows from this and from the small magnitude of the components of h(i) that there is a high probability that the estimated value $\hat{h}(i)$ will be completely false.

From these two items, it follows that the first order algorithms do not permit adaptation resulting from a fading incursion. A fading incursion is understood to be a situation in which the channel impulse response coefficients assume such small values that the useful component of the received signal disappears in the noise. Let us assume that the sector $A_{i-1}$ has been affected by a fading incursion. It now follows from the second item that there is a high probability that the estimated value of the channel impulse response in the sector $A_i$ will be highly erroneous. It now follows from the first item that this also applies to all further sectors $A_{i+1}$, $A_{i+2}$ etc.

If a fading incursion occurs in a data section, then the data behind (seen from the test sequence) this fading incursion can no longer be detected. The probability of such a fading incursion rises with the vehicle speed. This is the reason why first order algorithms fail at high vehicle speeds. In the GSM system, this statement applies to vehicle speeds above approximately 250 km/h.

2.4 Channel impulse response adaptation with the aid of a Kalman filter

The possibility for adaptation of the channel impulse response resulting from a fading incursion is a precondition for reliable mobile communication at very high vehicle speeds. Examples of the use of this are fast-moving trains, for which speeds up to 500 km/h are being discussed. The GSM system was initially designed for vehicle speeds up to around 250 km/h. Use of the GSM standard for mobile railway radio is possible only if the methods for channel impulse response adaptation and, in particular, its capability to adapt the channel impulse response caused by a fading incursion can be significantly improved throughout.

A significant improvement in the channel impulse response adaptation is possible only by means of higher order algorithms. In the case of such algorithms, the estimated value $\hat{h}(k)$ is dependent not only on $\hat{h}(k-1)$ (or $\hat{h}(k+1)$ in the case of backward adaptation), but on as many already determined values of $\hat{h}(k+n)$, $n \neq 0$ as possible. This enables improved utilization of the correlations of the channel impulse responses at different times.

Figure 4:
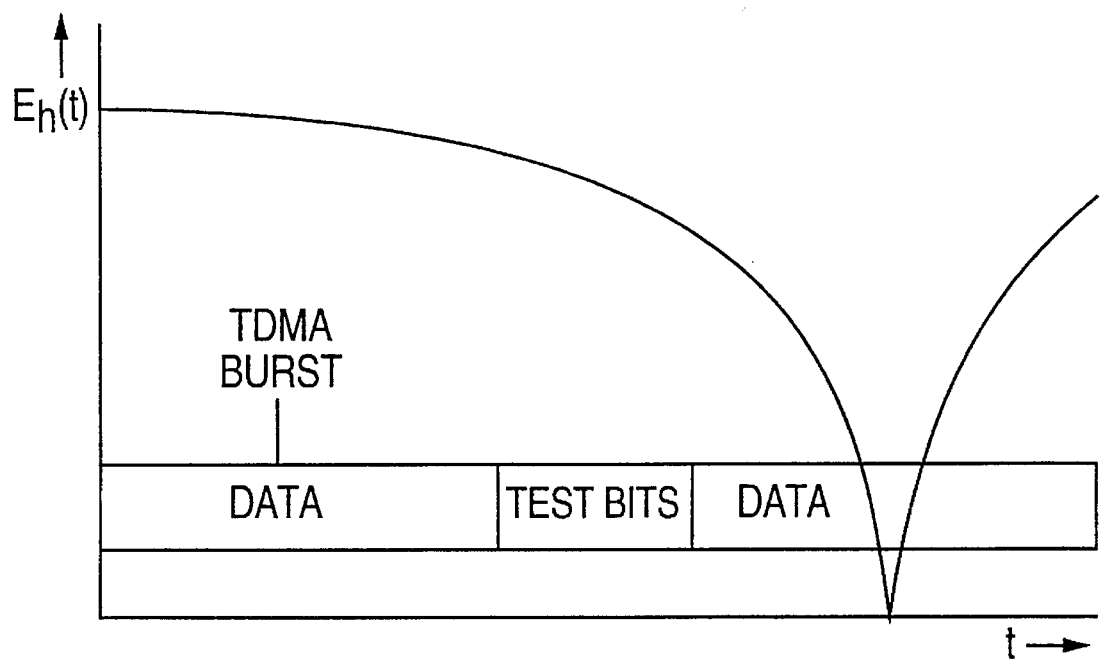
FIG. 4 shows a fading incursion in a TDMA burst.

Example: Let us assume the situation illustrated in FIG. 4.

$$E_h(t) = \sum_{l=0}^{L-1} |h(l,t)|^2$$

is the energy of the channel impulse response at time t. A fading incursion can be seen approximately in the center of the second data section. If a first order algorithm is used, which cannot adapt as a result of this fading incursion, the data bits at the end of the second data section would no longer be detectable. However, since the channel impulse response coefficients on both sides of the fading incursion are correlated with one another, it is quite possible to use the estimated channel impulse responses on the left-hand side to deduce those on the right-hand side of the fading incursion. However, it should be ensured for this purpose that the channel impulse response profile on the left-hand side of the fading incursion is completely known before any attempt is made to determine that on the right-hand side. A device must therefore be provided which initially provides all the reliable data regions, that is to say data regions which are not affected by a fading incursion, for detection before an affected region is processed (see equation [5]).

Figure 5:
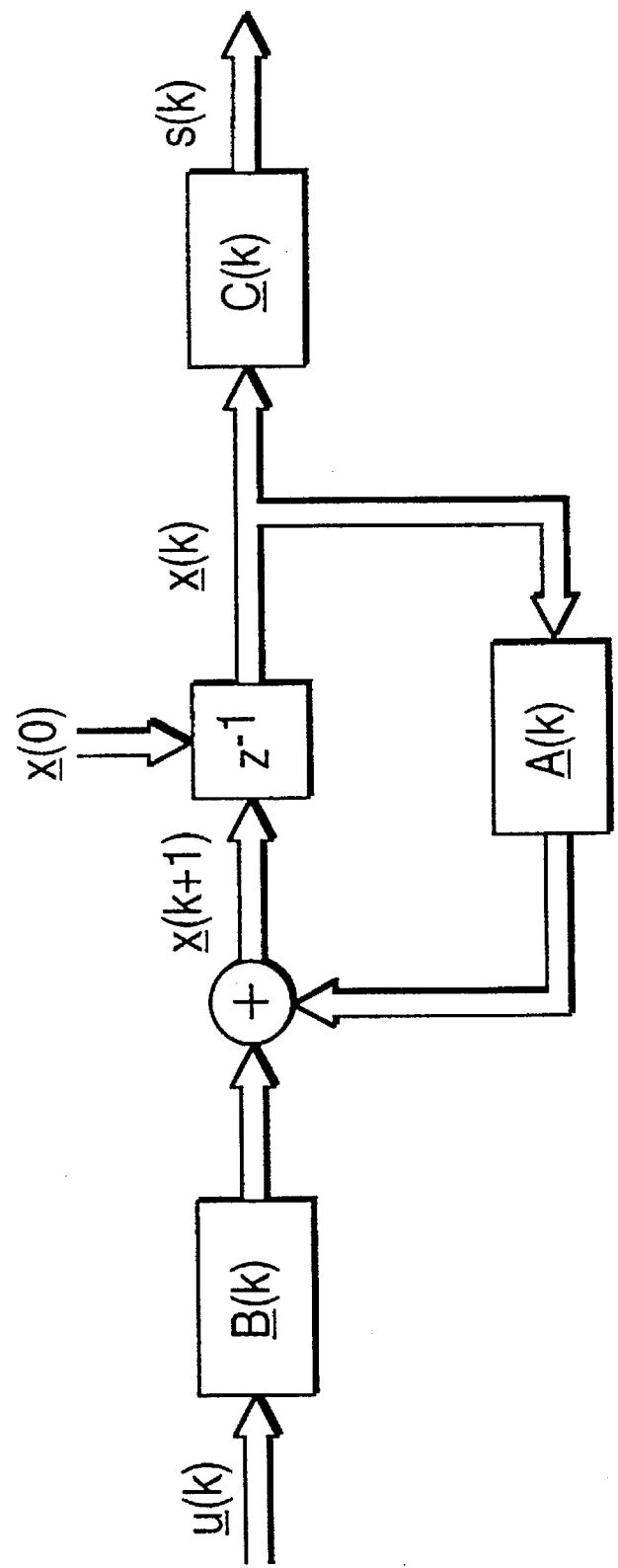
FIG. 5 illustrates a process model relating to the Kalman theory.

Before the description of the actual method, a brief summary of the theory of the Kalman filter should be permitted. The process model on which the Kalman theory is based is a vectorial sequential state model (see FIG. 5). x(k) is the state vector, u(k) the control vector and y(k) the output vector for the recursion step k in each case. The process model states that the state vector in the recursion step k+1 depends linearly on the state vector and the control vector in the recursion step k, i.e.

$$x(k+1)=A(k)x(k)+B(k)u(k) \tag{6}$$

The linear mapping is described by the matrices A(k) and B(k) which, in general, depend on the recursion step. The output vector is linearly dependent on the state vector $$y(k)=C(k)x(k).$$

The mapping matrix C(k) likewise in general depends on the recursion step. The initial state x(0) must be known in order to describe the recursion for $k \geq 0$ completely.

The object of the Kalman filter is to determine an estimated value for the state vector x(n+1) in the n-th recursion step, only disturbed versions of the output vectors y(0), ... ,y(n) being known to the filter. These disturbed versions are designated by z(k) and it is assumed to be a precondition that they are additively composed of the output vectors y(k) and disturbance vectors v(k), that is to say $$z(k)=y(k)+v(k)=C(k)x(k)+v(k). \tag{7}$$

The model is completely described by the equations (6) and (7).

The theory of Kalman filters is based on the assumptions that the control vectors and disturbance vectors are random processes with no mean values, the vectors being uncorrelated in different recursion steps, that is to say $$<u(k)>=<v(k)>=0$$

$$<u(k)u^*(l)>=U(k)\delta_{kl}$$

$$<v(k)v^*(l)>=V(k)\delta_{kl}.$$

The superscript * in this case means conjugation and transposition of the designated vector (or matrix). The matrices U(k) and V(k) describe the correlations of the components in the vectors u(k) and v(k)·$\hat{x}(k)$ is assumed to be the estimated value for x(k) for the (k−1)-th recursion step. Furthermore, it is assumed that $$E(k)=<[\hat{x}(k)-x(k)][\hat{x}(k)-x(k)]^*>$$

is the autocorrelation matrix of the estimated error. The Kalman filter can now be described by the following recursive algorithm.

$$P(k)=A(k)E(k)C^*(k)[V(k)+C(k)E(k)C^*(k)]^{-1} \quad (8)$$

$$\hat{x}(k+1)=[A(k)-P(k)C(k)]\hat{x}(k)+P(k)z(k) \quad (9)$$

$$E(k+1)=[A(k)-P(k)C(k)]E(k)[A(k)-P(k)C(k)]^* +P(k)V(k)P^*(k)+B(k)U(k)B^*(k). \quad (10)$$

The first of these equations is not a recursion equation and only the auxiliary variable P(k) is calculated using it. The actual recursion relates to the estimated value $\hat{x}(k)$ for the state vector x(k) and the error correlation matrix E(k). Suitable start values $\hat{x}(0)$ and E(0) must therefore be found for these two variables.

The method according to the invention now results from the application of these three equations to a suitable model for channel impulse response adaptation. As is described in Section 2.2, the burst is split into 2N+1 sectors $A_i$, i=-N, . . . ,+N, the assumed precondition here being that all the sectors are of the same length, that is to say each comprise M signal samples. It is assumed that the sector $A_0$ is located completely in the test sequence; the channel impulse response for this sector is therefore known with the estimation of the channel impulse response from the test sequence. The transmitted signal samples of the i-th sector are s(iM), . . . ,s((i+1)M−1), the associated received signal samples are r(iM), . . . ,r((i+1)M−1), and the noise samples are n(iM), . . . ,n((i+1)M−1). These samples can be combined to form the vectors $s_i$, $r_i$ and $n_i$. Furthermore, it should be assumed that the channel impulse response is constant within a sector. This assumption becomes the more accurate the smaller are the sectors, that is to say the smaller M, the number of signal samples per sector, is. The channel impulse response vector of the i-th sector is now designated $h_i$, i=-N, . . . ,+N.

The general sequence of processing a burst is characterized by the following points.

A burst is processed in 2N steps, the sector $A_i$ which is provided for this purpose by the reliability-controlled data detection being detected in the k-th step [5].

An estimated channel impulse response $\hat{h}_i(k)$ is assigned to each sector $A_i$ in the k-th step; this estimated value of the channel impulse response is used for the detection of the sector. With regard to the notation: the index i designates the sector to be processed, the variable k in brackets designates the processing step. $\hat{h}_i(k)$ is thus the estimated channel impulse response for the i-th sector, as results in the k-th processing step. The l-th component of a vector $\hat{h}$ is designated x(l). Theoretically, this can result in it being possible to confuse the processing step and the component. However, the meaning in each case becomes clear from the context.

After the detection of the sector $A_i$ in the k-th step, the transmitted signal samples of this sector can be reconstructed; to put this more precisely, the detection must be carried out such that the transmitted signal samples s(iM−L+1), . . . ,s((i+1)M−1) can be reconstructed. The matrix of dimension M×L can now be produced using these samples:

$$\underline{S_i} = \begin{pmatrix} s(iM) & \cdots & s(iM-L+1) \\ \cdot & & \cdot \\ \cdot & & \cdot \\ \cdot & & \cdot \\ s((i+1)M-1) & \cdots & s((i+1)M-L) \end{pmatrix} \quad (11)$$

As will be shown, this matrix can now be used to calculate a recursion step of the Kalman filter which updates the channel impulse responses for all the sectors.

An initial value for the channel impulse response is required not only for the Kalman recursion but also for the detection of the first sector. This initial value, which below will be designated $\hat{h}$, can be obtained with the aid of the test sequence provided in each burst. This estimated value is initially assigned to all the sectors; that is to say $\hat{h}_i(0)=\hat{h}$ applies for all i.

$$x(k)=(h^T_{-N}, \ldots, h^T_{+N})^T, \quad (12)$$

is now defined as the state vector, that is to say the concatenation of the channel impulse responses to be estimated for all the sectors. This state vector does not, of course, change with k. Therefore, it immediately follows from equation (6)

A(k)=I

B(k)=0 u(k)=0, where I is the unit matrix. All the variables in the first model equation (6) have therefore been found. The variables in the second model equation (7) are found by inserting equation (1) (11) in;

$$r_i = S_i h_i + n_i. \quad (13)$$

is obtained for the i-th sector.
If one now defines:

$\underline{z}(k) = \underline{r_i}$
$\underline{v}(k) = \underline{n_i}$
and $$C(k) = (\ \underbrace{0,\ldots,0}_{\substack{N+i \\ \text{0-matrices} \\ \text{of dimension} \\ M \times L}}\ ,\underline{S_i},\ \underbrace{0,\ldots,0}_{\substack{N-i \\ \text{0-matrices} \\ \text{of dimension} \\ M \times L}}\ ),$$

then equation (7) is obtained from equation (13). The model is therefore completely described. It should be noted at this point that the correlation matrix of the model noise V(k) is equal to $\sigma^2 I$ since the model noise, as seen above, is equal to the channel noise but this has been assumed to be uncorrelated with the variance $\sigma^2$.

In addition to the model, the initial values x(0), $\hat{x}(0)$ and E(0) must be defined. x(0) results in a trivial manner from (12). $\hat{x}(0)$ is obtained, as described above, by assigning to all the sectors the estimated value of the channel impulse response $\hat{h}$ from the test sequence.
Thus $$\hat{x}(0)=(\hat{h}^T,\ldots,\hat{h}^T)^T.$$

The initial value for the error correlation matrix can now be calculated from $x(0)$ and $\hat{x}(0)$.

$$E(0)=<[\hat{x}(0)-x(0)][\hat{x}(0)-x(0)]^*>=<\hat{x}(0)\hat{x}^*(0)>+<x(0)x^*(0)>-<x(0)\hat{x}^*(0)>-<\hat{x}(0)x^*(0)>.$$

This matrix has the dimension $(2N+1)L\times(2N+1)L$, its elements being annotated in the following text as $*Li+1, Li'+1'(0)$, $-N \leq i, i' \leq +N$, $0 \leq l, l' \leq L-1$. Thus, $$e_{Li+l,Li'+l'}(0)=<\hat{h}(l)\hat{h}^*(l')>+<h_i(l)h_{i'}^*(l')>-<h_i(l)\hat{h}^*(l')>-<\hat{h}(l)h_{i'}^*(l')>.$$

If the test sequences have been suitably selected, then $$\hat{h}(l)=h_0(l)+n_h(l),$$

where $n_h(l)$ is a random variable which is independent of $h_0(l)$, has a gaussian distribution and has no mean, where $$<n_h(l)n_h^*(l')>=\sigma_h^2 \delta_{ll'},$$

In practical applications, this assumption is valid at least to a good approximation. It follows that:

$$e_{Li+l,Li'+l'}(0)=<h_0(l)h_0^*(l')>+\sigma_h^2 \delta_{ll'}+<h_i(l)h_{i'}^*(l')>-<h_i(l)h_0^*(l')>-<h_0(l)h_{i'}^*(l')>.$$

With the formal notation $$\phi_{hh}(l,l',i,i')=<h_i(l)h_{i'}^*(l')>$$

the following is obtained $$e_{Li+l,Li'+l'}(0)=\phi_{hh}(l,l',0,0)+\sigma_h^2 \delta_{ll'}+\phi_{hh}(l,l',i,i')-\phi_{hh}(l,l',i,0)-\phi_{hh}(l,l',0,i').$$

The $\phi_{hh}(l,l',i,i')$ depend only on the properties of the transmission channel. The way in which these can be determined in the receiver is described further below.

The adaptation algorithm can now be summarized as follows.

The received burst is split into $2N+1$ sectors $A_{-N}, \ldots, A_{+N}$ each having M signal samples. It is assumed that the channel impulse response within a sector is constant.

A vector $\hat{x}$ of dimension $(2N+1)L$ is defined, whose contents at any time are the estimated channel impulse responses of the individual sectors. The components $\hat{x}(iL), \ldots, \hat{x}((i+1)L-1)$ of this vector are used as the channel impulse response for the detection of the i-th sector. Before starting the detection, $\hat{x}(iL+l)$ is initialized with $\hat{h}(l)$, the l-th component of the channel impulse response estimated from the test sequence.

A matrix E of dimension $(2N+1)L\times(2N+1)L$ is defined, whose $(iL+l, i'L+l')$-th element is initialized before the start of detection using $$e_{Li+l,Li'+l'}(0)=\phi_{hh}(l,l',0,0)+\sigma_h^2 \delta_{ll'}+\phi_{hh}(l,l',i,i')-\phi_{hh}(l,l',i,0)-\phi_{hh}(l,l',0,i').$$

where $$\phi_{hh}(l,l',i,i')=<h_i(l)h_{i'}^*(l')>,$$

is the correlation of the l-th component of the channel impulse response in the sector $A_i$ and the l'-th component of the channel impulse response in the sector $A_{i'}$, and $\sigma_h^2$ is the variance of the error in the estimation of the channel impulse response coefficients from the test signal. $E_i$ is assumed to be a matrix of dimension $(2N+1)L\times L$ whose columns, after the detection of the i-th sector, are the columns $iL, \ldots, (i+1)L-1$ of the matrix E. Furthermore, $E_{ii}$ is assumed to a matrix of dimension $L\times L$ whose lines, after the detection of the i-th sector, are the lines $iL, \ldots, (i+1)L-1$ of the matrix $E_i$.

A matrix S of dimension $M\times L$ is defined, whose $(m,l)$-th digit, after the detection of the i-th sector, is occupied by the reconstructed transmitted signal sample $s(iM+m-1)$.

A vector $\hat{x}_i$ of dimension L is defined, whose elements, after detection of the i-th sector, are equal to the elements $iL, \ldots, (i+1)L-1$ of $\hat{x}$, as well as the vector d, which, after the detection of the i-th sector, is $$d=r_i-S\hat{x}_i$$

where $r_i$ is a vector of dimension M and contains the received signal samples associated with the i-th sector $A_i$.

After the detection of the i-th sector, $$P=E_iS^*[\sigma^2 I+SE_{ii}S^*]^{-1}$$

is now calculated, and the recursions $$\hat{x}:=\hat{x}+Pd$$

$$E:=E+PSE_i^*$$ are carried out.

These recursions result from trivial transformations of the general equations (8), (9) and (10), taking account of the model parameters.

The particular advantage of this algorithm is justified by the fact that the channel impulse responses of all the sectors are updated in every recursion step. The k-th recursion of the channel impulse response in the sector $A_i$ in this case depends on the channel impulse responses of all the sectors in the recursion step $k-1$. This results in the capability of the algorithm to adapt to fading incursions.

As stated above, in order to operate optimally, the algorithm needs to know the channel correlation properties $$\phi_{hh}(l,l',i,i')=<h_i(l)h_{i'}^*(l')>.$$

However, it is found that the algorithm also operates satisfactorily if, instead of the above $\phi_{hh}(l,l',i,i')$, completely different values, but values which are selected in a physically sensible manner, are selected for initialization of the error correlation matrix. $\phi_{hh}(l,l',i,i')$ depends in general on the Doppler frequency $$f_d=f_0 \frac{v}{c}$$

(that is to say, finally, on the vehicle speed and the carrier frequency) and the incidence angles of the received radiation components with respect to the movement direction of the mobile subscriber. Physically sensible initialization of the error correlation matrix is obtained by estimating $\phi_{hh}(l,l',i,i')$ for the worst case situation and using these values for the initialization.

Another option is to calculate, in the receiver, estimated values for the $\phi_{hh}(l,l',i,i')$. For this purpose, the receiving process is started using the above worst case estimate for the $\phi_{hh}(l,l',i,i')$. After a burst has been completely detected, estimated values for the channel impulse responses $h_i$ are available for all the sectors, and to be precise $\hat{x}(iL+1)$, the $(iL+1)$-th component of the estimated state vector $\hat{x}$ (after the last step in the channel impulse response adaptation), is a suitable estimated value for $h_i(l)$. A suitable estimated value for $\phi_{hh}(l,l',i,i')$ is now obtained by averaging $\hat{x}(iL+1)\hat{x}^*(i'L+1')$ over time.

References

[1] B. Widrow, J. M. McCool, M. G. Larimore, C. R. Johnson, "Stationary and NonstationaryLearning Characteristics of the LMS Adaptive Filter", *Proceedings of the IEEE*, Vol. 64, No. 8, pp. 1151–1162, 1976.

[2] E. Eleftheriou, D. D. Falconer, "Tracking Properties and Steady-State Performance of RLS Adaptive Filter Algorithms", *IEEE Transactions on Acoustic, Speech and Signal Processing*, Vol. ASSP-34, No. 5, pp. 1097–1110, 1986.

[3] R. E. Kalman "A New Approach to Linear Filtering and Prediction Problems", Trans ASME, Series D, *Journal of Basic Engineering*, Vol. 82, 1960, pp. 35–45.

[4] P. A. Bello, "Characterization of Randomly Time-Variant Linear Channels", *IEEE Transactions on Communications Systems*, Vol. CS-11, pp. 360–393, 1963.

[5] F. J. Hagmanns, "Zuverlässigkeitsgesteuerte Datendetektion in Empfängern für TDMA-Mobilfunksysteme, Patentanmeldung entsprechend der Deutschen Patentschrift DE-C 43 11 604 (internationale Patentanmeldung PCT/DE 94/00308)" [Reliability-controlled data detection in receivers for TDMA mobile radio systems Patent Application in accordance with the German Patent Specification DE-C 43 11 604, (International Patent Application PCT/DE 94/00308)].

I claim:

1. A method for adaptation to the time-variable channel impulse response during a burst in receivers for TDMA mobile radio systems, each burst including in the center between two data regions a test sequence which is known to the receiver and by means of which an initial estimate of the channel impulse response is possible, wherein the received signal of a burst is sampled, the received burst is divided into $2N+1$ sectors $A_{-N}, \ldots, A_{+N}$, in such a manner that the channel impulse response can be regarded as being constant within a sector, a vector $\hat{X}$ of dimension $(2N+1)L$ is defined, L being the number of channel impulse response coefficients and the $(iL+1)$-th component of $\hat{X}$, $-N \leq i \leq +N$, $0 \leq l \leq L-1$ is initialized before the start of detection using the l-th coefficient of the estimated value of the channel impulse response obtained from the test sequence, a matrix E of dimension $(2N+1)L \times (2N+1)L$ is defined, whose $(iL+1,i'L+1')$-th element is initialized using $$e_{Li+l,Li'+l'}(0)=\phi_{hh}(l,l'''',0,0)+\sigma_h^2\delta_{ll'\cdots}+\phi_{hh}(l,l'''',i,i')-\phi_{hh}(l,l'''',i,0)-\phi_{hh}(l,l'''',0,i'''').$$

where $\phi_{hh}(l,l'''',i,i'''')$ is an approximation to $<h_i(l)h_{i'}^*(l'''')>$ and is the correlation of the l-th component of the channel impulse response in the sector $A_i$ and the l'-th component of the channel impulse response in the sector $A_{i'}$, and $\sigma_h^2$ is the variance of the error in the estimate of the channel impulse response coefficients from the test signal, a matrix $E_i$ of dimension $(2N+1)L \times L$ is defined, whose columns, after the detection of the i-th sector, are the columns $iL, \ldots, (i+1)L-1$ of the matrix E, a matrix $E_{ii}$ of dimension $L \times L$ is defined, whose lines, after the detection of the i-th sector are the lines $iL, \ldots, (i+1)L-1$ of the matrix $E_i$, a matrix S of dimension $M \times L$ is defined, whose $(m,l)$-th digit, after detection of the i-th sector, is occupied by reconstructed transmitted signal sample $s(iM+m-1)$ where M is the number of signal samples in a section, a vector $\hat{x}_i$ of dimension L is defined, whose elements, after detection of the i-th sector, are equal to the elements $iL, \ldots, (i+1)L-1$ of $\hat{x}$, a vector d of dimension M is defined which, after the detection of the i-th sector, is $$d=r_i-S\hat{x}_i$$

where $r_i$ is a vector of dimension M and contains the received signal samples associated with the i-th sector $A_i$, each burst is processed in 2N steps, where in the k-th step, the i-th sector is detected using the components $iL, \ldots, (i+1)L-1$ of the vector $\hat{x}$, the sector $A_i$ being selected by a method by means of which, initially, all the data sections which are not affected by a fading incursion are provided for detection before an affected data section is processed, the matrix $$P=E_iS^*[\sigma^2I+SE_{ii}S^*]^{-1}$$

is calculated, where $\sigma^2$ is the variance of the noise contained in the received signal samples, and the recursions $$\hat{x}:=\hat{x}+Pd$$

$$E:=E+PSE_i^*$$

are carried out.

* * * * *